United States Patent
Stone

(10) Patent No.: US 11,180,243 B2
(45) Date of Patent: Nov. 23, 2021

(54) ROTARY ENGINE/CENTRIFUGAL FAN AIRCRAFT PROPULSION

(71) Applicant: Anchor Concrete Inc., Covington, KY (US)

(72) Inventor: Nicholas Mathew Stone, Covington, KY (US)

(73) Assignee: Anchor Concrete Inc., Covington, KY (US)

( * ) Notice: Subject to any disclaimer, the term of this patent is extended or adjusted under 35 U.S.C. 154(b) by 388 days.

(21) Appl. No.: 16/432,201

(22) Filed: Jun. 5, 2019

(65) Prior Publication Data
US 2020/0385104 A1    Dec. 10, 2020

(51) Int. Cl.
| | |
|---|---|
| *B64D 27/02* | (2006.01) |
| *B64C 11/00* | (2006.01) |
| *B64C 23/00* | (2006.01) |
| *B64C 11/20* | (2006.01) |
| *B64C 29/00* | (2006.01) |

(52) U.S. Cl.
CPC ............ *B64C 23/005* (2013.01); *B64C 11/20* (2013.01); *B64C 29/0025* (2013.01)

(58) Field of Classification Search
CPC ....... B64C 27/20; B64C 27/22; B64C 11/001; B64C 39/006; B64D 27/06
See application file for complete search history.

(56) References Cited

U.S. PATENT DOCUMENTS

| | | | |
|---|---|---|---|
| 1,172,991 A * | 2/1916 | Heidbreder | B64C 11/001 244/73 R |
| 1,389,797 A | 9/1921 | Thompson | |
| 1,522,711 A * | 1/1925 | Brown | B64C 27/20 244/74 |
| 1,736,632 A * | 11/1929 | Schmidt | B64C 39/006 244/70 |
| 1,741,578 A | 12/1929 | Lyons | |
| 1,961,214 A * | 6/1934 | Hall | B64C 11/001 415/148 |
| 2,461,435 A | 2/1949 | Neumann et al. | |
| 3,080,137 A | 3/1963 | Hurel et al. | |
| 3,689,011 A | 9/1972 | Torelli | |
| 4,828,203 A | 5/1989 | Clifton et al. | |
| 6,230,836 B1 | 5/2001 | Cowan et al. | |
| 7,308,869 B2 | 12/2007 | Stone | |
| 9,688,396 B2 | 6/2017 | Avery, III | |
| 9,868,523 B2 | 1/2018 | Hymer | |
| 2008/0169375 A1 | 7/2008 | Ishikawa | |

FOREIGN PATENT DOCUMENTS

| | | | | |
|---|---|---|---|---|
| FR | 450882 A * | 4/1913 | ........... | B64C 39/006 |
| GB | 331801 | 7/1930 | | |
| GB | 441823 | 1/1936 | | |
| GB | 494576 | 10/1938 | | |
| JP | 2021030931 A * | 3/2021 | ............. | B64C 27/22 |

* cited by examiner

*Primary Examiner* — Brian M O'Hara
(74) *Attorney, Agent, or Firm* — Middleton Reutlinger

(57) ABSTRACT

An aircraft propulsion system utilizes a rotary engine to drive a centrifugal fan providing a thrust vector that is generally orthogonal to an axis of rotation of the rotary engine and the fan. The aircraft propulsion system may be mounted, for example, in the wing of a fixed-wing aircraft with the rotary engine and the centrifugal fan rotating about an axis of rotation that is generally parallel to a yaw axis of the aircraft.

20 Claims, 5 Drawing Sheets

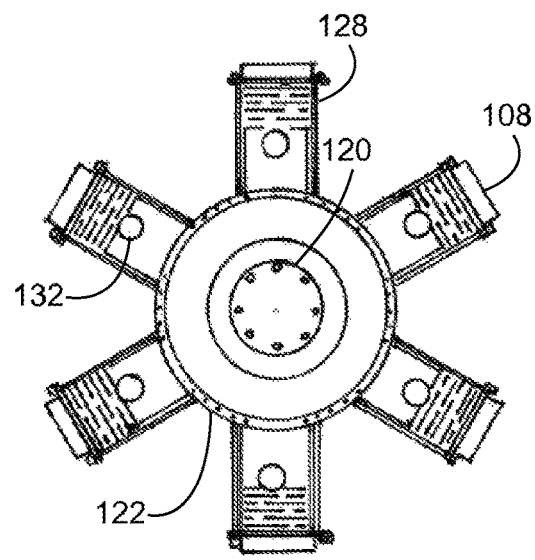
FIG. 9
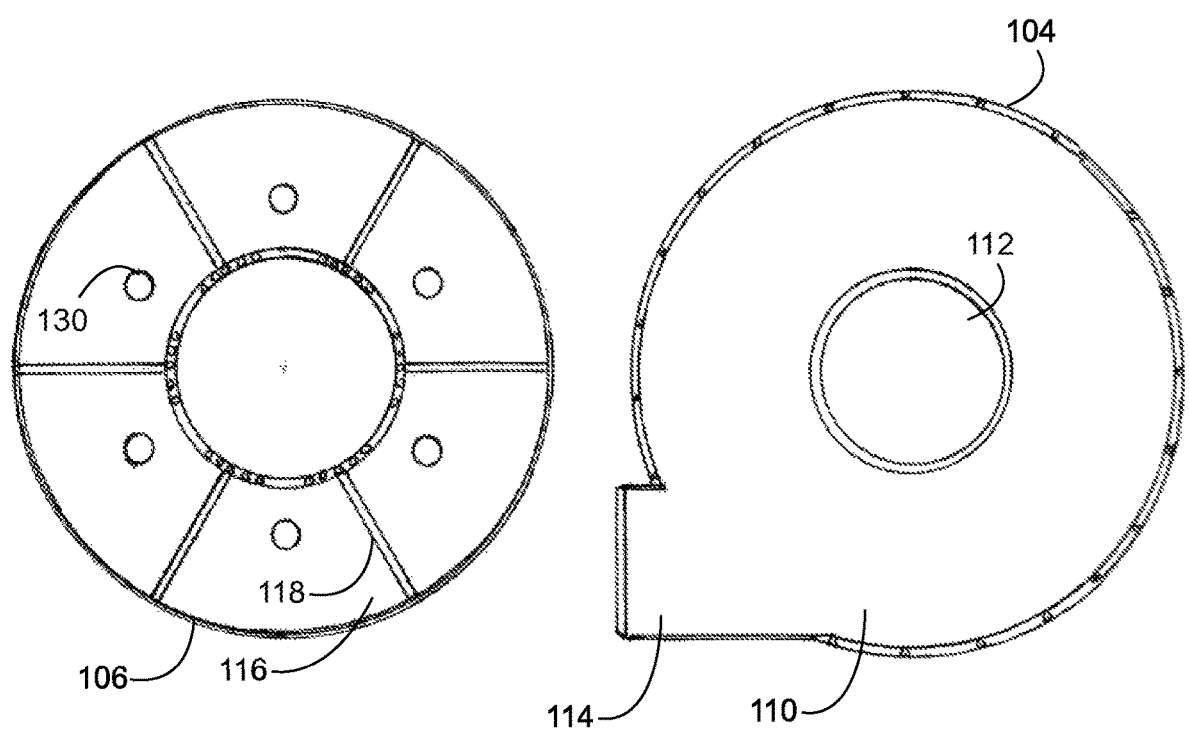
FIG. 10  FIG. 11

ROTARY ENGINE/CENTRIFUGAL FAN AIRCRAFT PROPULSION

BACKGROUND

Internal combustion engines, and more specifically, reciprocating internal combustion engines, have been used for aircraft propulsion in a wide variety of applications. A conventional internal combustion engine typically includes a crankshaft, a crankcase disposed about the crankshaft, one or more cylinders exposed to the crankcase, a piston adapted to reciprocate within each cylinder, and a connecting rod drivingly coupling each piston to the crankshaft. The crankcase may be fixed to the frame of a vehicle such that the reciprocation of the pistons causes the crankshaft to rotate about an axis. Alternatively, the crankshaft may be fixed to the frame of a vehicle such that the reciprocation of the pistons causes the crankcase and cylinders to rotate about the crankshaft. Both of these configurations were commonly used to power aircraft in the early days of aviation, and engines having the latter configuration with several cylinders radially disposed about the crankshaft were often referred to as "Gnome"-type engines.

These engines may also be considered to be a type of rotary engine, whereby the crankshaft is fixed and a crankcase and one or more cylinders rotate about the fixed crankshaft. Such engines have generally been used for aircraft propulsion by mounting the engines to the front of the fuselage and/or wings of an aircraft with the axis of rotation about the crankshaft oriented generally parallel to a longitudinal axis of the aircraft (i.e., generally in the direction of flight), and with a propeller mounted for rotation with the crankcase and about the axis of rotation to generate thrust for propelling the aircraft. The thrust is used to propel the aircraft forward through the air, with the geometry of the wings used to provide lift for the aircraft, and as such, the axis of rotation is generally parallel to the direction of thrust generated by such engines.

Propellers, however, have been found to have a number of drawbacks, particularly when used with rotary engines. For example, propellers can present a safety risk to people in the vicinity of an aircraft while still on the ground. Moreover, particularly with regard to rotary engines, the rotating mass of the propeller and crankcase induces gyroscopic precession that can lead to instability in certain instances. Propellers furthermore may be subject to icing in cold weather, and are relatively loud. In addition, particularly when mounted to the front of the aircraft, a rotary engine has a relatively large cross-section that can increase drag.

Therefore, a need exists in the art for an aircraft propulsion system that addresses the aforementioned disadvantages of propeller-based propulsion systems, particularly for use in connection with a rotary engine.

SUMMARY

The invention addresses these and other problems associated with the art by providing an aircraft propulsion system that utilizes a rotary engine to drive a centrifugal fan providing a thrust vector that is generally orthogonal to an axis of rotation of the rotary engine and the fan. The aircraft propulsion system may be mounted, for example, in the wing of a fixed-wing aircraft with the rotary engine and the centrifugal fan rotating about an axis of rotation that is generally parallel to a yaw axis of the aircraft.

Therefore, consistent with one aspect of the invention, an aircraft powerplant may include a housing including a forward-facing inlet and a rearward-facing outlet, a centrifugal fan disposed in the housing and configured to produce forward thrust for an aircraft through the rearward-facing outlet of the housing, the centrifugal fan configured to rotate about a first axis of rotation to direct an air stream out of the rearward-facing outlet of the housing in a generally tangential direction relative to the first axis of rotation, and a rotary engine including a stationary crankshaft and a crankcase rotatable about the stationary crankshaft for rotation about a second axis of rotation that is substantially parallel to the first axis of rotation. The crankcase is operably coupled to the centrifugal fan to rotate the centrifugal fan about the first axis of rotation and thereby produce forward thrust through the rearward-facing outlet of the housing.

In addition, in some embodiments, the first and second axes of rotation are coincident with one another. Also, in some embodiments, the rotary engine is disposed in the housing. Moreover, in some embodiments, the housing, the centrifugal fan and the rotary engine are configured for mounting in an aircraft wing with the first and second axes of rotation oriented generally orthogonal to a longitudinal axis of the aircraft. Further, in some embodiments, the forward-facing inlet of the housing is configured to direct incoming air toward the centrifugal fan in a generally axial direction relative to the first axis of rotation. Also, in some embodiments, the rotary engine is disposed above the centrifugal fan when mounted in the aircraft. Further, in some embodiments, the rotary engine is disposed below the centrifugal fan when mounted in the aircraft.

In some embodiments, the rotary engine further includes a plurality of cylinders radially extending from the crankcase, and a plurality of pistons received in the plurality of cylinders and operably coupled to the stationary crankshaft. Also, in some embodiments, the crankcase includes a plurality of ports and has a unitary construction, and the plurality of cylinders radially extend through the plurality of ports in the crankcase. In some embodiments, the rotary engine further includes a valve assembly including an exhaust valve associated with each cylinder and a valve tappet associated with each exhaust valve for operating the exhaust valve, and a fuel assembly including a fuel injector associated with each cylinder and a fuel pump associated with each cylinder for providing pressurized fuel to the fuel injectors.

Further, in some embodiments, the rotary engine further includes an air blower mounted to the crankshaft and adapted to deliver pressurized air into the crankcase. In some embodiments, the centrifugal fan includes a plurality of port holes positioned to deliver pressurized air into the plurality of cylinders. Further, in some embodiments, the crankcase further includes an oil pan disposed on an underside of the crankcase when mounted in the aircraft.

Consistent with another aspect of the invention, an aircraft may include a fuselage having a longitudinal axis, a wing extending from the fuselage and configured to generate lift in response to air flow across the wing, and a powerplant disposed on the wing. The powerplant may include a housing including a forward-facing inlet and a rearward-facing outlet, a centrifugal fan disposed in the housing and configured to produce forward thrust for the aircraft through the rearward-facing outlet of the housing, the centrifugal fan configured to rotate about a first axis of rotation to direct an air stream out of the rearward-facing outlet of the housing in a generally tangential direction relative to the first axis of rotation, and a rotary engine including a stationary crankshaft and a crankcase rotatable about the stationary crankshaft for rotation about a second axis of rotation that is substantially parallel to the first axis of rotation. The crankcase is operably coupled to the centrifugal fan to rotate the centrifugal fan about the first axis of rotation and thereby produce forward thrust through the rearward-facing outlet of the housing.

Also, in some embodiments, the powerplant is a first powerplant and the wing is a first wing, and the aircraft further includes a second wing extending from an opposite side of the fuselage from the first wing, and a second powerplant disposed on the second wing, the second powerplant including a housing including a forward-facing inlet and a rearward-facing outlet, a centrifugal fan disposed in the housing and configured to produce forward thrust for the aircraft through the rearward-facing outlet of the housing, the centrifugal fan configured to rotate about a first axis of rotation to direct an air stream out of the rearward-facing outlet of the housing in a generally tangential direction relative to the first axis of rotation, and a rotary engine including a stationary crankshaft and a crankcase rotatable about the stationary crankshaft for rotation about a second axis of rotation that is substantially parallel to the first axis of rotation. The crankcase is operably coupled to the centrifugal fan to rotate the centrifugal fan about the first axis of rotation and thereby produce forward thrust through the rearward-facing outlet of the housing.

In addition, in some embodiments, the housing for each of the first and second powerplants forms a portion of an airfoil for the respective first and second wing. In some embodiments, the rearward-facing outlet of each of the first and second powerplants is positioned inwardly of the respective first axes of rotation for the first and second powerplants relative to the fuselage, and the respective rotary engines of the first and second powerplants drive the respective centrifugal fans for the first and second powerplants in opposite directions. In addition, in some embodiments, the first and second axes of rotation are coincident with one another. Also, in some embodiments, the rotary engine is disposed above the centrifugal fan. In addition, in some embodiments, the rotary engine is disposed below the centrifugal fan.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter

BRIEF DESCRIPTION OF THE DRAWINGS

FIG. 9 is a top plan view of the rotary engine of the rotary engine/centrifugal fan propulsion system of FIG. 7.

FIG. 10 is a top plan view of the centrifugal fan of the rotary engine/centrifugal fan propulsion system of FIG. 7.

FIG. 11 is a plan view of the blower shroud of the rotary engine/centrifugal fan propulsion system of FIG. 7.

DETAILED DESCRIPTION

Figure 1:
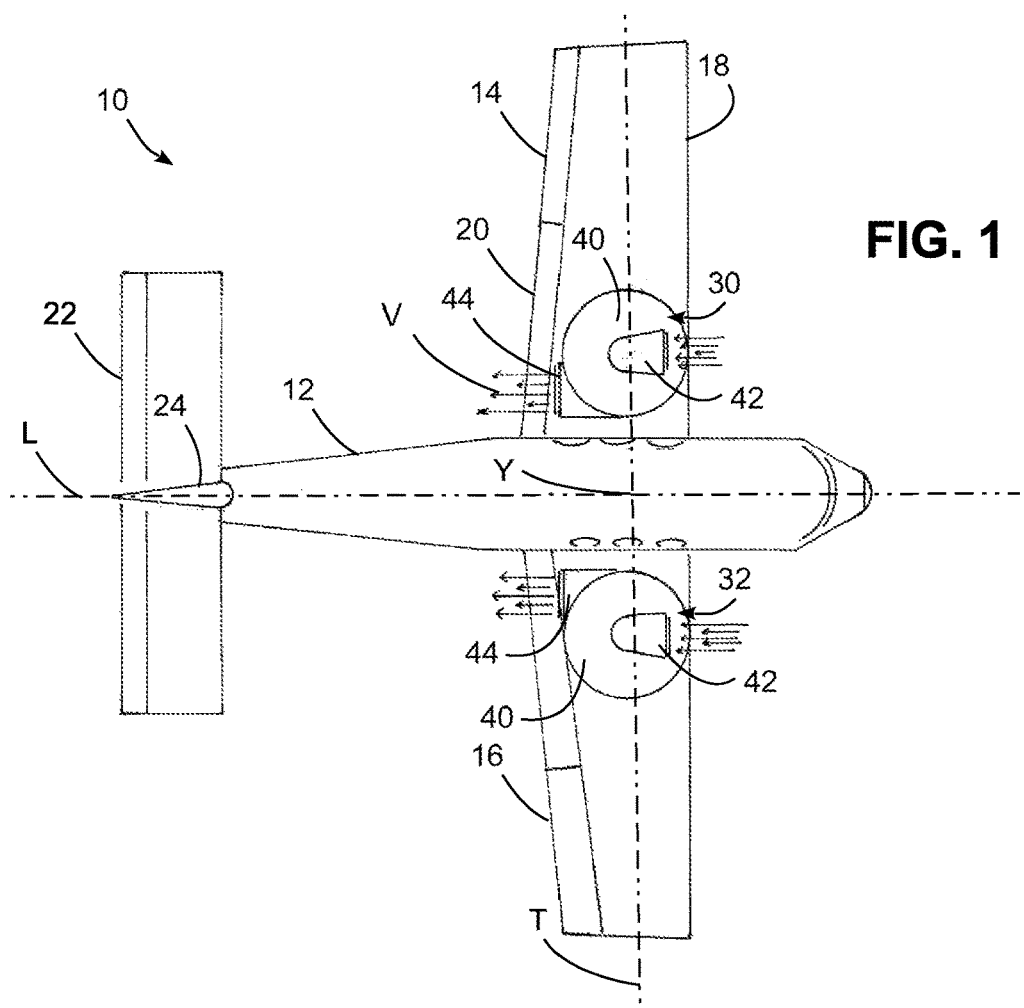
FIG. 1 is a top plan view of an example aircraft utilizing dual rotary engine/centrifugal fan propulsion systems consistent with some embodiments of the invention.
Figure 2:
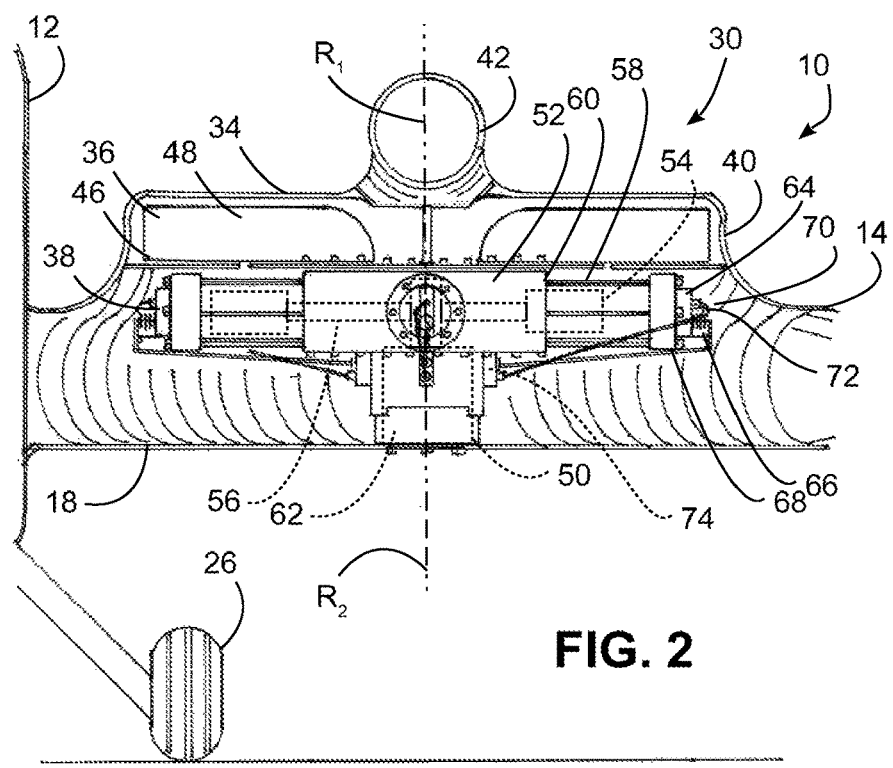
FIG. 2 is a partial front elevational view of a left wing portion of the aircraft of FIG. 1, illustrating a left rotary engine/centrifugal fan propulsion system mounted thereon, and having portions thereof cut away.

Now turning to the Drawings, wherein like numbers denote like parts throughout the several views, FIG. 1 illustrates an example implementation of a fixed wing aircraft 10 consistent with some embodiments of the invention. Aircraft 10 includes a fuselage 12 extending generally along a longitudinal axis L of the aircraft, as well as left and right wings 14, 16, each having a leading edge 18 and a trailing edge 20 and having a cross-section defining an airfoil that generates lift for the aircraft in response to air flow across the wing. Aircraft 10 may also include horizontal and vertical stabilizers 22, 24 as well as various movable control surfaces, e.g., ailerons, rudders, elevators, slats, flaps, spoilers, etc. (not separately numbered in FIG. 1) to control the movement of the aircraft while in flight. In addition, as illustrated in FIG. 2, aircraft 10 may also include landing gear 26, which may be fixed in some implementations, while in other implementations, may be retractable into the fuselage 12 or wing 14, 16 of the aircraft during flight.

Returning to FIG. 1, longitudinal axis L forms a roll axis for aircraft 10, and a transverse axis T generally operates as a pitch axis for aircraft 10. A yaw axis Y that is orthogonal to both longitudinal axis L and transverse axis T is also defined for aircraft 10 to define the movement and orientation of the aircraft during flight.

With additional reference to FIGS. 2-6, propulsion of aircraft 10 in the illustrated embodiment is provided by a pair of powerplants 30, 32 mounted to, integrated with, or otherwise disposed on each wing 14, 16. Each powerplant 30, 32 includes a housing 34, a horizontally-oriented centrifugal fan 36, and a horizontally-oriented rotary engine 38 configured to generate thrust generally in a direction V illustrated in FIG. 1. Housing 34, for example, may include a shroud 40 defining a forward-facing inlet 42 and a rearward-facing outlet 44, and as may be seen in FIG. 1, air is received by inlet 42, compressed by centrifugal fan 36 within housing 34 and ejected from outlet 44 to generate forward thrust for propelling the aircraft.

In the illustrated embodiment, centrifugal fan 36 is disposed in housing 34 and configured to produce forward thrust for aircraft 10 through rearward-facing outlet 44 in response to rotation of centrifugal fan 36 about a first axis of rotation $R_1$ (illustrated in FIG. 2) to direct an air stream out of rearward-facing outlet 44 in a generally tangential direction relative to first axis of rotation $R_1$. With specific reference to FIGS. 2-4 and 6, centrifugal fan 36 in some embodiments may be configured with a flat circular disk 46 with a plurality of radially-extending blades 48 extending generally transverse to the plane of disk 46 but extending short of axis of rotation $R_1$ to provide an air inlet that receives air generally along the direction of axis of rotation $R_1$, and with blades 48 accelerating the air in a radial direction toward the perimeter of centrifugal fan 36 due to centrifugal force. In this regard, forward-facing inlet 42 of housing 34 may be configured to direct incoming air toward centrifugal fan 36 in a generally axial direction relative to axis of rotation $R_1$.

Figure 3:
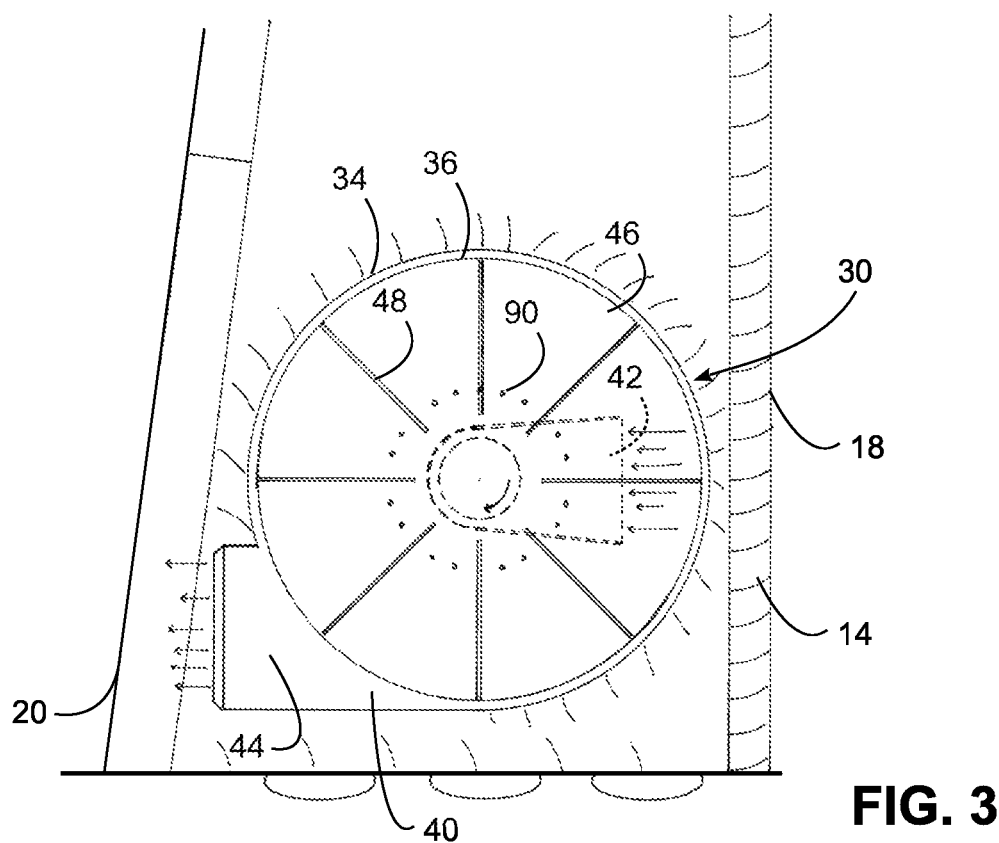
FIG. 3 is a partial top plan view of the left wing portion of FIG. 2, with portions thereof cut away.

While blades 48 are illustrated as being planar in cross-section, other blade shapes may be used in other embodiments, including shapes that curve toward the direction of rotation, shapes that curve away from the direction of rotation, or other profiles to vary air flow as desired. Moreover, while 8 blades 48 are illustrated in FIG. 3, other numbers of blades may be used in other embodiments, so the invention is not limited to the particular number and configuration of blades used for centrifugal fan 36.

Rotary engine 38 includes a stationary crankshaft 50 and a crankcase 52 that is rotatable about the stationary crankshaft 50 for rotation about a second axis of rotation $R_2$ that is substantially parallel to first axis of rotation $R_1$, and crankcase 52 is operably coupled to centrifugal fan 36 to rotate centrifugal fan 36 about first axis of rotation $R_1$ and thereby produce forward thrust through rearward-facing outlet 44 of housing 34. In the illustrated embodiment, centrifugal fan 36 is directly mounted to crankcase 52 in a direct drive configuration such that axes of rotation $R_1$ and $R_2$ are, in addition to being parallel to one another, also coincident with one another, i.e., such that both centrifugal fan 36 and rotary engine 38 essentially rotate about the same axis of rotation. It will be appreciated, however, that in other embodiments, axes of rotation $R_1$ and $R_2$ may be separate from one another, and crankcase 52 may be operably coupled to centrifugal fan 36 through a belt drive, a chain drive, a gearing arrangement, a transmission, etc., which in some embodiments may provide a variable drive to vary the rotational speed of centrifugal fan 36 relative to rotary engine 38, or even reverse airflow through powerplant 30 if desired. Centrifugal fan 36 and rotary engine 38 may also rotate in opposite directions in some embodiments if desired.

Rotary engine 38 in some embodiments may be configured as a radial compression-ignition engine that includes a plurality of pistons 54 operably coupled to crankshaft 50 via connecting rods 56 for travel within a plurality of radially-extending cylinders 58, e.g., as described in U.S. Pat. No. 7,308,869 to Nicholas Stone (hereinafter, the "'869 patent"), which is incorporated by reference herein. Rotary engine 38 is a compression-ignition engine that runs on diesel fuel; however, it will be appreciated that in other embodiments other compression-ignition engine designs, as well as various types of spark-ignition engine designs, may be used in the alternative. Further, rotary engine 38 includes four radially-extending cylinders 58; however in other designs, other cylinder arrangements, as well as other numbers of cylinders, may be used, so the invention is not limited to the particular rotary engine designs described herein, and in particular, is not limited to the particular rotary engine design described in the '869 patent.

Figure 4:
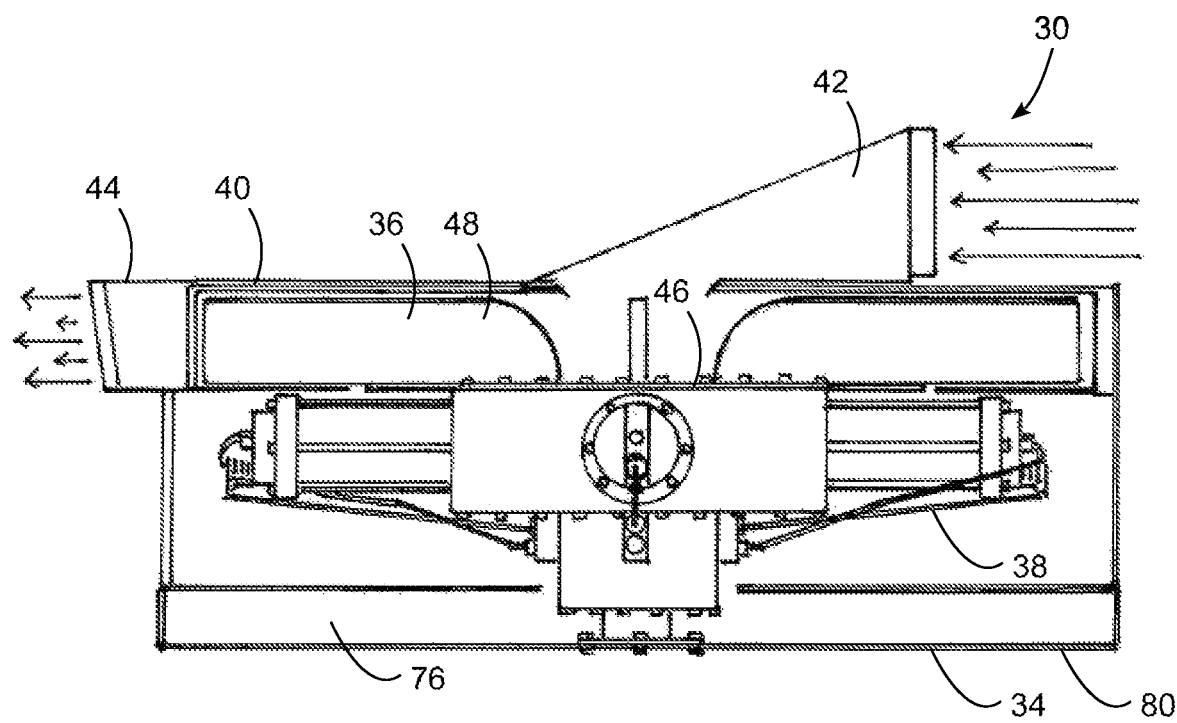
FIG. 4 is a side elevational view of the left rotary engine/centrifugal fan propulsion system of FIGS. 2-3, with portions thereof cut away.

As described in the '869 patent, crankcase 52 of rotary engine 38 may include a plurality of ports 60 and may have a unitary construction, such that the plurality of cylinders 58 radially extend through the plurality of ports 60. In addition, each of the plurality of cylinders 58 may have a unitary construction adapted to withstand pressures associated with compression-ignition of a fuel. Further, rotary engine 38 may include a valve assembly 64 including an exhaust valve 66 associated with each cylinder 58 and a valve tappet 68 associated with each exhaust valve 66 for operating the exhaust valve 66, as well as a fuel assembly 70 including a fuel injector 72 associated with each cylinder 58 and a fuel pump 74 associated with each cylinder for providing pressurized fuel to the fuel injectors 72. Moreover, an air blower 62 may also be mounted to crankshaft 50 and adapted to deliver pressurized air into crankcase 52. Further, with reference to FIGS. 4 and 6, given the horizontal arrangement of rotary engine 38, a lower portion 76 of housing 34 may be used as an oil pan to collect lubricating oil for distribution to the cylinders by an oil pump (not shown).

Figure 5:
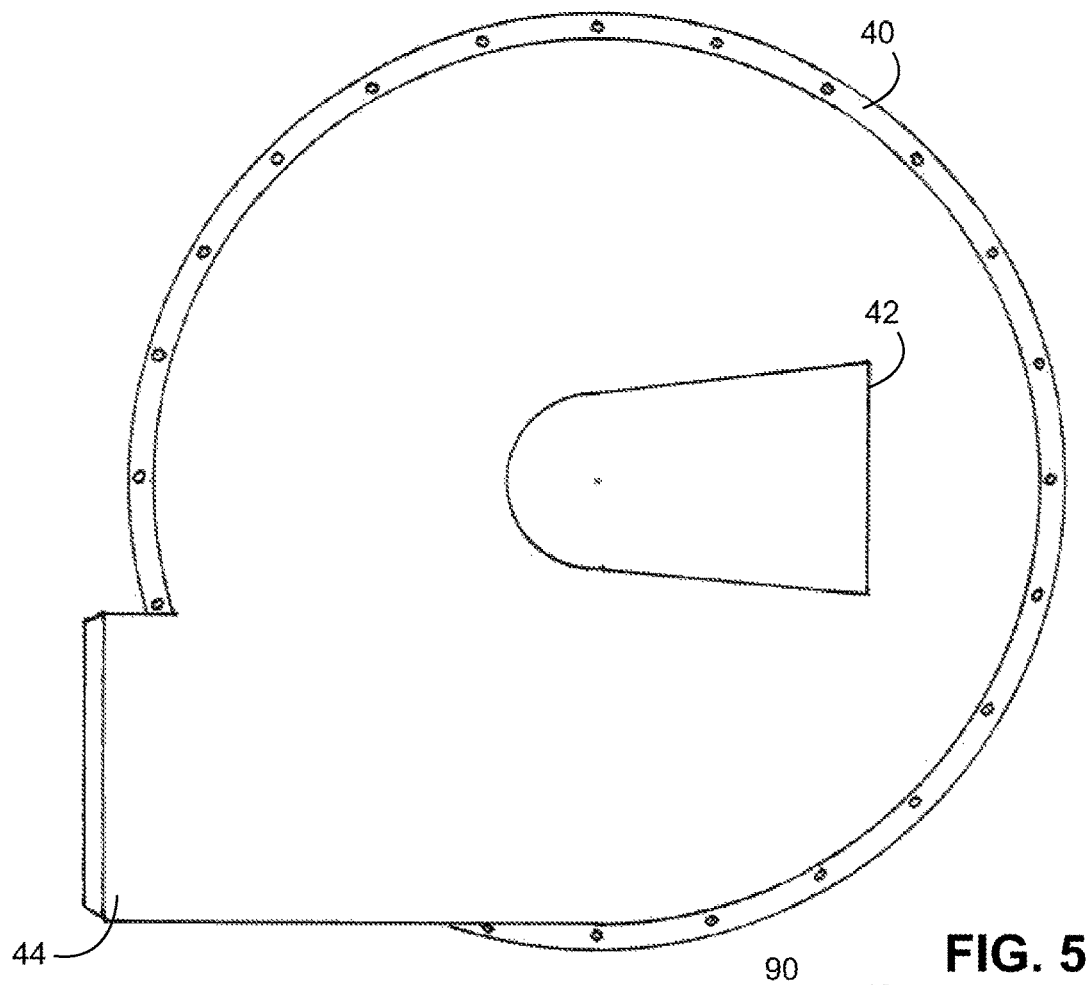
FIG. 5 is a top plan view of the blower housing of the left rotary engine/centrifugal fan propulsion system of FIG. 4.
Figure 6:
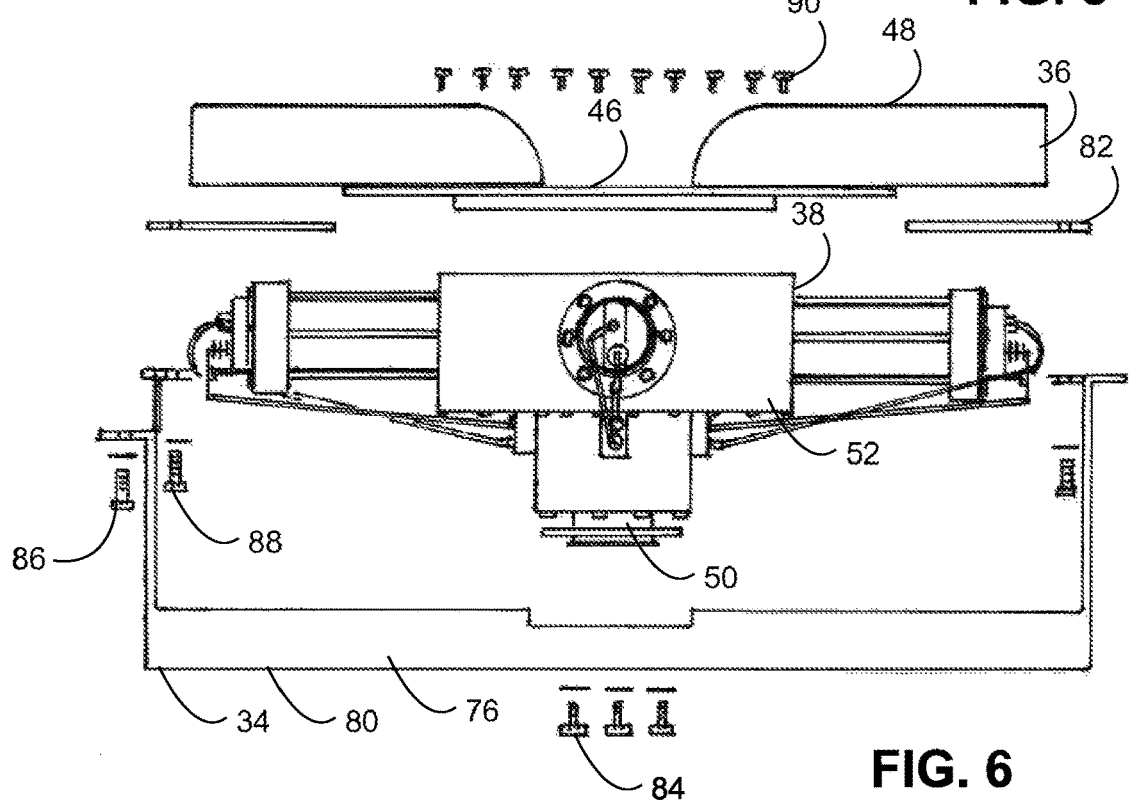
FIG. 6 is an exploded side elevational view of the left rotary engine/centrifugal fan propulsion system of FIG. 4, with portions thereof cut away.
Figure 7:
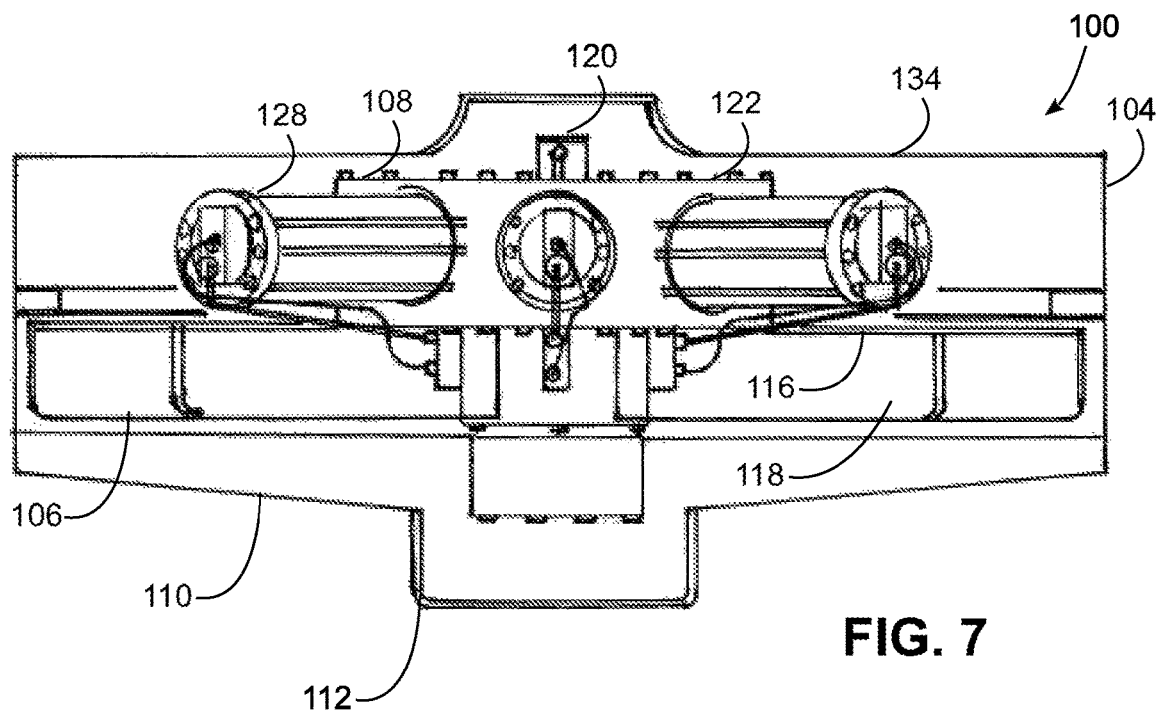
FIG. 7 is a front elevational view of another example implementation of a rotary engine/centrifugal fan propulsion system consistent with some embodiments of the invention, with portions thereof cut away.

With further reference to FIGS. 5 and 6, in some embodiments, centrifugal fan 36 and rotary engine 38 may be mounted in a base 80 of housing 34, with a fixed divider plate 82 provided therebetween, with fasteners 84 securing crankshaft 50 of rotary engine 38 to base 80, fasteners 86 securing housing 34 to wing 14, fasteners 88 securing shroud 40 to base 80, and fasteners 90 securing centrifugal fan 36 to crankcase 52 of rotary engine 38.

With specific reference to FIGS. 1-3, housing 34, centrifugal fan 36, rotary engine 38, shroud 40, inlet 42 and outlet 44 are configured for mounting in an aircraft wing with first and second axes of rotation $R_1$, $R_2$ oriented generally orthogonal to longitudinal axis L of aircraft 10, and are desirably configured to form a portion of the airfoil profile for the wing, or put another way, present a profile that minimizes drag and/or optimizes airflow over wing 14. It will be appreciated that the configuration of such components therefore may vary considerably in other embodiments based upon desired airflow characteristics for aircraft 10. It will also be appreciated that a powerplant consistent with the invention may be configured to operate in a clockwise or counter-clockwise manner in different embodiments. As illustrated in FIG. 1, for example, centrifugal fan 36 and rotary engine 38 of powerplant 30 may be configured to rotate in a clockwise direction when viewed from above, while the corresponding components of powerplant 32 may be configured to rotate in an opposite, counter-clockwise direction, such that shroud 40 of powerplant 32 is a reverse configuration from shroud 40 of powerplant 30. Doing so may be desirable in some embodiments to orient the outlets 44 adjacent to fuselage 12 and reduce the offset of the thrust vectors produced by each powerplant from the longitudinal axis L of the aircraft. In this manner, the outlet of each powerplant is positioned inwardly of the axis of rotation(s) for the respective powerplants relative to fuselage 12, which can reduce torque effects in the event that one engine is non-operational. Thus, it will be appreciated that powerplants 30, 32 are oriented such that rotary engine 38 and centrifugal fan 36 rotate about axes of rotation that that are generally parallel to the yaw axis of the aircraft.

Powerplant 30 provides a number of advantages over conventional designs. As compared to vertically-oriented radial engines, for example, oil drains into an oil pan in a lower portion of the housing instead of a bottom cylinder. In addition, the horizontal orientation of powerplant 30 presents comparatively less drag than vertically-oriented radial engines.

Furthermore, the generally enclosed and horizontally-oriented centrifugal fan presents less drag than a vertically-oriented propeller or fan blade, and given that the centrifugal fan is generally enclosed within the housing, the dangers associated with prop strikes with people, birds, or other objects is substantially reduced. The horizontal orientation may also enable shorter and/or non-retractable landing gear to be used in some aircraft designs due to the fact that the ground clearance for the aircraft does not need to accommodate a vertically-oriented propeller. Further, the housing and shroud generally surround both the centrifugal fan and rotary engine in some embodiments to protect the aircraft and occupants from any parts of the engine or centrifugal fan that may become dislodged from the powerplant as a result of a failure. The powerplant in some embodiments may also be a substantially self-contained unit capable of being installed into and removed from an aircraft with relative ease compared to vertically-oriented radial engines and propeller-based powerplants used on many aircraft, thus providing a substantially simpler design than found in many conventional aircraft. Additional advantages associated with a rotary engine as used herein are also discussed in the aforementioned '869 patent.

The positioning of the powerplant within a wing may also enable the leading edge of a wing to be heated by exhaust heat generated by a rotary engine using suitable ducts and for de-icing purposes. In addition, with the fan and rotary engine enclosed within the housing, noise may be reduced, as may the drag experienced by vertically-oriented propellers. Propeller icing may also be avoided as a result of an enclosed fan.

It is also believed that the horizontally-oriented rotary engine and centrifugal fan provide greater stability and reduced vibrations that are inherent to high compression engines. The mass of the rotary engine and centrifugal fan operates generally as a flywheel to dampen harmonic vibrations, and in some embodiments, the mass of the centrifugal fan may be made as light or heavy as desired. Greater aircraft stability (e.g., lateral and/or longitudinal stability) may also be achieved as a result of gyroscopic effects such as precession due to angular momentum of the spinning mass about a generally vertical axis of rotation, similar to a Frisbee flying disc, as a spinning mass generally resists motion at a right angle to the axis of rotation of the mass.

Now turning to FIGS. 7-11, while it will be appreciated that in powerplants 30, 32 of FIGS. 1-6, centrifugal fan 36 is disposed above rotary engine 38, it may also be desirable in some embodiments to utilize an opposite configuration whereby a rotary engine is disposed above a centrifugal fan, as illustrated by powerplant 100. In this design, a housing 104 receives a horizontally-oriented centrifugal fan 106, and a horizontally-oriented rotary engine 108, but with rotary engine 108 disposed above centrifugal fan 106 within housing 104. Housing 104 includes a lower shroud 110 defining a forward-facing inlet 112 and a rearward-facing outlet 114, and as may be seen in FIG. 8, air is received by inlet 112, compressed by centrifugal fan 106 within housing 104 and ejected from outlet 114 to generate forward thrust for propelling the aircraft.

In the illustrated embodiment, centrifugal fan 106 may be configured with a flat circular disk 116 with a plurality of radially-extending blades 118 extending generally transverse to the plane of disk 116, and rotating about an axis of rotation R. Further, forward-facing inlet 112 of housing 104 may be configured to direct incoming air toward centrifugal fan 106 in a generally axial direction relative to axis of rotation R.

Rotary engine 108 includes a stationary crankshaft 120 and a crankcase 122 that is rotatable about the stationary crankshaft 120 for rotation about the same axis of rotation R, and crankcase 122 is operably coupled to centrifugal fan 106 to rotate centrifugal fan 106 about the axis of rotation and thereby produce forward thrust through rearward-facing outlet 114 of housing 104. As illustrated in FIG. 9, rotary engine 108 may also include a plurality of cylinders 128. Six cylinders 128 are used for powerplant 100, although it will be appreciated that other numbers of cylinders may be used in other designs.

Centrifugal fan 106 may be directly mounted to crankcase 122 in a direct drive configuration. Moreover, in this embodiment, no separate air blower is used for rotary engine 108, and instead, centrifugal fan 106 includes a plurality of port holes 130 that are aligned with corresponding ports 132 in cylinders 128 of rotary engine 108 such that centrifugal fan 106 provides a source of pressurized air to cylinders 128 in a similar manner to an air blower.

Figure 8:
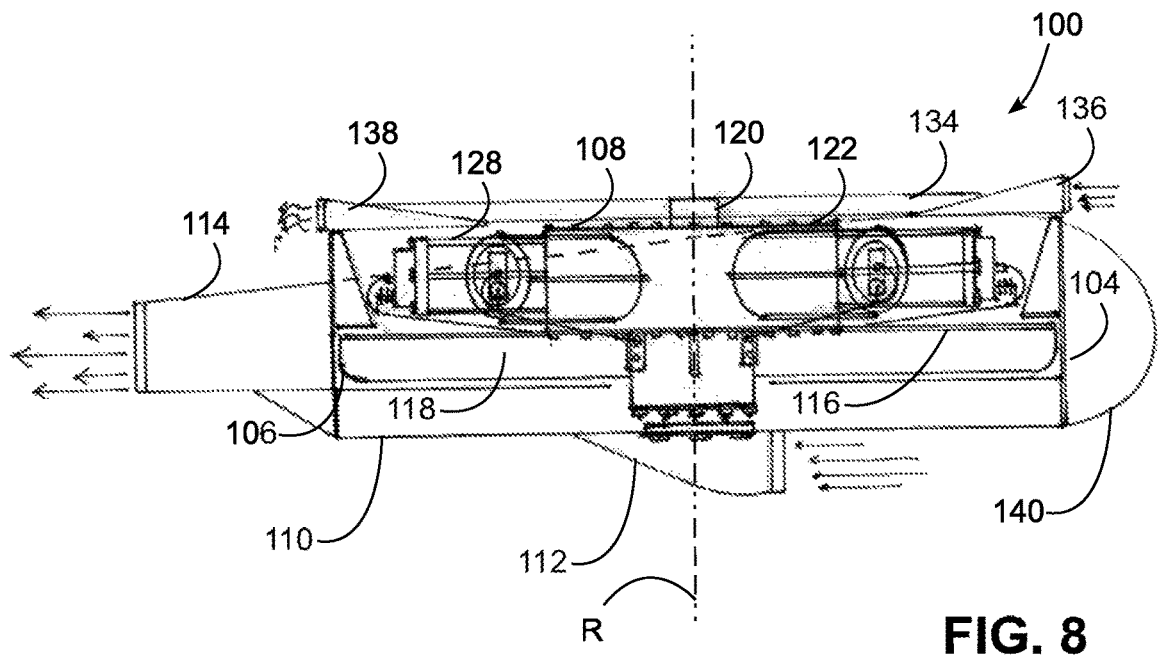
FIG. 8 is a side elevational view of the rotary engine/centrifugal fan propulsion system of FIG. 7, with portions thereof cut away.

Moreover, with specific reference to FIG. 8, it may also be desirable in some embodiments to additionally include an upper shroud 134 providing access to rotary engine 108 as well as including an engine air inlet 136 and engine air outlet 138 to provide additional cooling circulation for rotary engine 108. Furthermore, as illustrated at 140, housing 104 may also form a portion of the airfoil for a wing in some embodiments.

Additional advantages of powerplant 100 include a generally lower center of gravity, a more streamlined design, and an arrangement that places the stress of the fan more directly on the main roller bearings of the rotary engine.

Various additional modifications may be made to the illustrated embodiments. For example, powerplants consistent with the invention may be mounted at other points on an aircraft, e.g., farther out on a wing, on a top or bottom surface of a wing, at the front of the fuselage, on the sides of the fuselage, on a horizontal or vertical stabilizer, or in other suitable locations. Moreover, a single powerplant may be used in some embodiments, and more than two powerplants may be used in other embodiments. Such powerplants may also be used in other aircraft designs, including biplanes, single wing designs, alternative vertical and/or horizontal stabilizer designs, etc.

Although the preceding description has been described herein with reference to particular means, materials, and embodiments, it is not intended to be limited to the particular disclosed herein. Furthermore, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. An aircraft powerplant, comprising:
   a housing including a forward-facing inlet and a rearward-facing outlet;
   a centrifugal fan disposed in the housing and configured to produce forward thrust for an aircraft through the rearward-facing outlet of the housing, the centrifugal fan configured to rotate about a first axis of rotation to direct an air stream out of the rearward-facing outlet of the housing in a generally tangential direction relative to the first axis of rotation; and
   a rotary engine including a stationary crankshaft and a crankcase rotatable about the stationary crankshaft for rotation about a second axis of rotation that is substantially parallel to the first axis of rotation, wherein the crankcase is operably coupled to the centrifugal fan to rotate the centrifugal fan about the first axis of rotation and thereby produce forward thrust through the rearward-facing outlet of the housing.

2. The aircraft powerplant of claim 1, wherein the first and second axes of rotation are coincident with one another.

3. The aircraft powerplant of claim 1, wherein the rotary engine is disposed in the housing.

4. The aircraft powerplant of claim 1, wherein the housing, the centrifugal fan and the rotary engine are configured for mounting in an aircraft wing with the first and second axes of rotation oriented generally orthogonal to a longitudinal axis of the aircraft.

5. The aircraft powerplant of claim 1, wherein the forward-facing inlet of the housing is configured to direct incoming air toward the centrifugal fan in a generally axial direction relative to the first axis of rotation.

6. The aircraft powerplant of claim 1, wherein the rotary engine is disposed above the centrifugal fan when mounted in the aircraft.

7. The aircraft powerplant of claim 1, wherein the rotary engine is disposed below the centrifugal fan when mounted in the aircraft.

8. The aircraft powerplant of claim 1, wherein the rotary engine further includes a plurality of cylinders radially extending from the crankcase, and a plurality of pistons received in the plurality of cylinders and operably coupled to the stationary crankshaft.

9. The aircraft powerplant of claim 8, wherein the crankcase includes a plurality of ports and has a unitary construction, and wherein the plurality of cylinders radially extend through the plurality of ports in the crankcase.

10. The aircraft powerplant of claim 9, wherein the rotary engine further comprises:
a valve assembly including an exhaust valve associated with each cylinder and a valve tappet associated with each exhaust valve for operating the exhaust valve; and
a fuel assembly including a fuel injector associated with each cylinder and a fuel pump associated with each cylinder for providing pressurized fuel to the fuel injectors.

11. The aircraft powerplant of claim 10, wherein the rotary engine further comprises an air blower mounted to the crankshaft and adapted to deliver pressurized aft into the crankcase.

12. The aircraft powerplant of claim 10, wherein the centrifugal fan includes a plurality of port holes positioned to deliver pressurized air into the plurality of cylinders.

13. The aircraft powerplant of claim 1, wherein the crankcase further includes an oil pan disposed on an underside of the crankcase when mounted in the aircraft.

14. An aircraft, comprising:
a fuselage having a longitudinal axis;
a wing extending from the fuselage and configured to generate lift in response to aft flow across the wing; and
a powerplant disposed on the wing, the powerplant including:
a housing including a forward-facing inlet and a rearward-facing outlet;
a centrifugal fan disposed in the housing and configured to produce forward thrust for the aircraft through the rearward-facing outlet of the housing, the centrifugal fan configured to rotate about a first axis of rotation to direct an aft stream out of the rearward-facing outlet of the housing in a generally tangential direction relative to the first axis of rotation; and
a rotary engine including a stationary crankshaft and a crankcase rotatable about the stationary crankshaft for rotation about a second axis of rotation that is substantially parallel to the first axis of rotation, wherein the crankcase is operably coupled to the centrifugal fan to rotate the centrifugal fan about the first axis of rotation and thereby produce forward thrust through the rearward-facing outlet of the housing.

15. The aircraft of claim 14, wherein the powerplant is a first powerplant and the wing is a first wing, and wherein the aircraft further comprises:
a second wing extending from an opposite side of the fuselage from the first wing; and
a second powerplant disposed on the second wing, the second powerplant including:
a housing including a forward-facing inlet and a rearward-facing outlet;
a centrifugal fan disposed in the housing and configured to produce forward thrust for the aircraft through the rearward-facing outlet of the housing, the centrifugal fan configured to rotate about a first axis of rotation to direct an air stream out of the rearward-facing outlet of the housing in a generally tangential direction relative to the first axis of rotation; and
a rotary engine including a stationary crankshaft and a crankcase rotatable about the stationary crankshaft for rotation about a second axis of rotation that is substantially parallel to the first axis of rotation, wherein the crankcase is operably coupled to the centrifugal fan to rotate the centrifugal fan about the first axis of rotation and thereby produce forward thrust through the rearward-facing outlet of the housing.

16. The aircraft of claim 15, wherein the housing for each of the first and second powerplants forms a portion of an airfoil for the respective first and second wing.

17. The aircraft of claim 15, wherein the rearward-facing outlet of each of the first and second powerplants is positioned inwardly of the respective first axes of rotation for the first and second powerplants relative to the fuselage, and wherein the respective rotary engines of the first and second powerplants drive the respective centrifugal fans for the first and second powerplants in opposite directions.

18. The aircraft of claim 14, wherein the first and second axes of rotation are coincident with one another.

19. The aircraft of claim 14, wherein the rotary engine is disposed above the centrifugal fan.

20. The aircraft of claim 14, wherein the rotary engine is disposed below the centrifugal fan.

* * * * *